(12) United States Patent
Witopil et al.

(10) Patent No.: US 12,152,689 B2
(45) Date of Patent: Nov. 26, 2024

(54) PNEUMATIC VALVE FOR CONTROLLING A GASEOUS MEDIUM

(71) Applicant: ECO Holding 1 GmbH, Marktheidenfeld (DE)

(72) Inventors: Mario Witopil, Marktheidenfeld (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 57 days.

(21) Appl. No.: 18/088,666

(22) Filed: Dec. 26, 2022

(65) Prior Publication Data

US 2023/0313906 A1  Oct. 5, 2023

(30) Foreign Application Priority Data

Apr. 4, 2022 (DE) .......................... 102022107951.1

(51) Int. Cl.
*F16K 31/40* (2006.01)
*H01M 8/04082* (2016.01)
*H01M 8/04089* (2016.01)

(52) U.S. Cl.
CPC ....... *F16K 31/406* (2013.01); *H01M 8/04089* (2013.01); *H01M 8/04201* (2013.01)

(58) Field of Classification Search
CPC .. F16K 31/406; F16K 31/1221; F16K 31/124; Y10T 137/7761; Y10T 137/7765; Y10T 137/7766; Y10T 137/7768; H01M 8/04089; H01M 8/04753; H01M 8/04746

See application file for complete search history.

(56) References Cited

U.S. PATENT DOCUMENTS

| | | | |
|---|---|---|---|
| 2013/0133759 A1* | 5/2013 | Kato | H01M 8/2457 137/488 |
| 2013/0186487 A1* | 7/2013 | Nomichi | G05D 7/0635 137/487 |
| 2021/0033212 A1* | 2/2021 | Kurz | F16K 1/443 |
| 2021/0148485 A1* | 5/2021 | Magel | H01M 8/04089 |

* cited by examiner

*Primary Examiner* — Reinaldo Sanchez-Medina
(74) *Attorney, Agent, or Firm* — Von Rohrscheidt Patent

(57) ABSTRACT

A pneumatic valve for controlling a gaseous medium, the pneumatic valve including a housing including an inlet and an outlet; a primary piston that forms a primary stage in cooperation with a primary valve seat in the housing, wherein the primary piston is axially movable in a housing bore along a longitudinal axis to open and close a direct volume flow connection between the inlet and the outlet; a pilot piston that forms a pilot stage in cooperation with a pilot valve seat at or in the primary piston, wherein the pilot piston is operatively connected with an electromagnetic actuator for opening or closing a throttle bore in the primary piston, wherein the inlet is connectable with the outlet indirectly through the primary piston by the throttle bore.

11 Claims, 3 Drawing Sheets

PNEUMATIC VALVE FOR CONTROLLING A GASEOUS MEDIUM

RELATED APPLICATIONS

This application claims priority from and incorporates by reference German patent application DE 10 2022 107 951.1 filed on Apr. 4, 2022.

FIELD OF THE INVENTION

The invention relates to a pneumatic valve for controlling a gaseous medium, in particular hydrogen.

BACKGROUND OF THE INVENTION

In the field of motor vehicle development, gaseous fuels in particular hydrogen are considered a viable alternative to conventional liquid fuels. In order to control these propulsion systems, large pressure and volume flow ranges need to be controlled. The desired control quality is not achievable with conventional control valves.

BRIEF SUMMARY OF THE INVENTION

Thus, it is an object of the invention to provide a pneumatic valve in particular for hydrogen which has large pressure or volume flow control ranges with high control quality.

It is another object of the invention to provide a method for controlling the pneumatic valve advantageously for hydrogen.

The object is achieved according to the invention by a pneumatic valve for controlling a gaseous medium, the pneumatic valve including a housing including an inlet and an outlet; a primary piston that forms a primary stage in cooperation with a primary valve seat in the housing, wherein the primary piston is axially movable in a housing bore along a longitudinal axis to open and close a direct volume flow connection between the inlet and the outlet; a pilot piston that forms a pilot stage in cooperation with a pilot valve seat at or in the primary piston, wherein the pilot piston is operatively connected with an electromagnetic actuator for opening or closing a throttle bore in the primary piston, wherein the inlet is connectable with the outlet indirectly through the primary piston by the throttle bore; and a back cavity that is formed between the primary piston and the housing, wherein the back cavity is connectable through the pilot stage with the inlet, wherein the primary stage and the pilot stage are closed when no electric current is provided to the pneumatic valve.

Advantageous embodiments with useful and non-trivial improvements of the invention are specified in the dependent claims.

The pilot stage advantageously provides a volume flow connection of inlet and outlet through the throttle bore hole and a controlled pressure buildup in the back cavity. This helps to effectively prevent a steep pressure rise at the outlet and the pneumatic valve provides a high level of control quality. Only opening the primary stage provides a direct volume flow connection between the inlet and the outlet.

When the rear cavity is connected with the inlet, a force acting in an opening direction is generated on an effective surface in the rear cavity. The primary stage opens when this force is greater than a sum of forces acting in the closing direction or when an actuator force is introduced into the primary piston. Put differently the primary stage is pressure controlled and also force controlled.

Due to the invention, a plurality of valves is not required to cover a large pressure or volume flow control range with high control quality with a corresponding number of housings, actuators, etc. Instead, the pneumatic valve according to the invention combines two valves in one housing so that the two valves can be adjusted by one actuator controlled by force and/or pressure. Component count, installation space and cost can be reduced.

Advantageously the actuator is provided as an electromagnetic actuator wherein the pilot piston is movable into an opening position by an armature of the actuator wherein the volume flow connection from the inlet into the back cavity can be established in the open position.

According to an advantageous embodiment of the invention the primary piston and the pilot piston are respectively forcible into a closed position by spring devices, wherein a first compression spring that is configured to load the primary piston is arranged between the primary piston and the housing and a second compression spring that is configured to load the pilot piston is arranged between the primary piston and the pilot piston or between the armature and an actuator housing or a pole cap.

According to an advantageous embodiment, the primary piston includes a stop so that a pilot piston is applicable to the stop, so that a pilot piston stroke is limited or actuator force is introduced into the primary piston.

Advantageously the pilot stage is configured as a variable throttle. Thus, the pressure in the back cavity is increased as a function of a stroke of the pilot piston, thus control quality can be significantly improved.

The object is also achieved by a method for controlling a gaseous medium, in particular hydrogen in a fuel cell arrangement, by a pneumatic valve wherein a primary stage and a pilot stage of the pneumatic valve is closed when the actuator is not provided with current and the pilot stage is open when the actuator is provided with a constant electrical current so that a volume flow connection between the input and the back cavity is opened, so that pressure is provided in the back cavity and the input is simultaneously connected through the throttle bore in the primary piston with the output. The primary stage opens as soon as the pressure in the back cavity generates a force in opening direction upon an effective surface of the piston top wherein the effective force is greater than a sum of forces acting in the closing direction.

Additionally, the primary stage can open when the pilot piston contacts its stop in the primary piston and the primary piston is pulled open by the pilot piston when the actuator force increases further. In this case the force in the back cavity acting in the opening direction must not be greater than a sum of forces acting in the closing direction. Thus, the stop not only limits the stroke of the pilot piston but also introduces an actuator force into the primary piston.

Advantageously a first force acting in a closing direction of the primary piston is generated by an output pressure at the output impacting a circular annular surface defined by the piston top minus a valve seat surface of the main valve seat, a second force acting in the closing direction of the main piston is generated by the input pressure acting on the primary piston, and a third force acting in the closing direction of the primary piston is generated by a spring preload of the compression spring.

The method according to the invention is configured to achieve a high level of control quality in a greater pressure or volume flow control range without requiring plural valves.

Additional advantages of the invention can be derived from the dependent claims, the description and the drawing figure.

BRIEF DESCRIPTION OF THE DRAWINGS

The invention is subsequently described based on advantageous embodiments with reference to drawing figures, wherein.

DETAILED DESCRIPTION OF THE INVENTION

Figure 1:
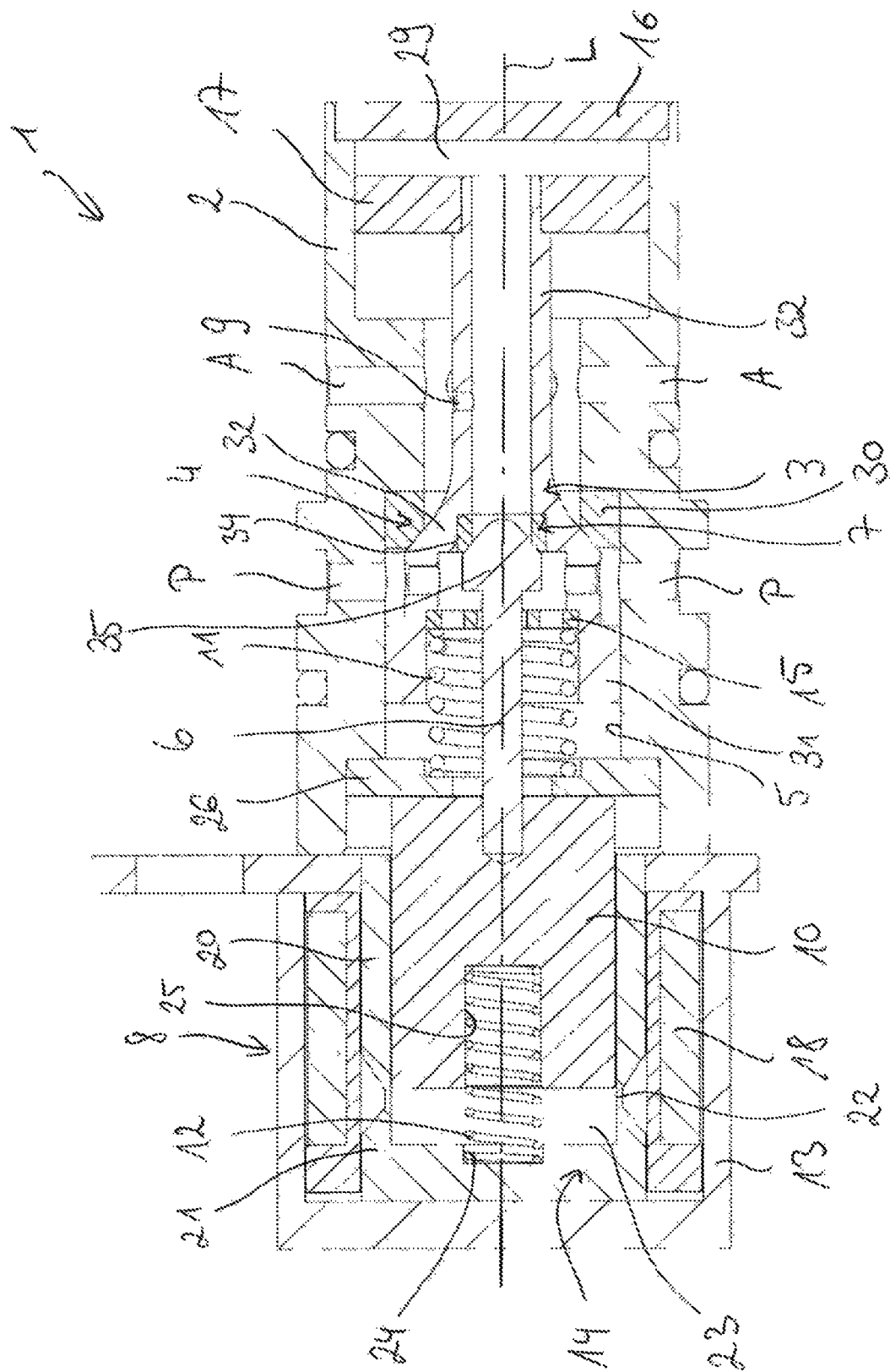
FIG. 1 illustrates a longitudinal sectional view of a pneumatic valve according to the invention in a closed position where the primary stage and the pilot stage are closed.

FIG. 1 shows the pneumatic valve 1 according to the invention in a longitudinal sectional view in a closed position, wherein the pneumatic valve is configured to control a flow of a gaseous medium, in particular hydrogen.

The pneumatic valve 1 includes a housing 2 including an input P and an output A, wherein the input P and the output A are configured as housing bore holes where conduits of a fuel cell arrangement are connectable.

The housing 2 includes a primary piston 3 configured to open and close a direct volume flow connection between the input P and the output A, and axially movable along a longitudinal axis L of the pneumatic valve 1 in a housing bore hole 5 including shoulders and forms a primary stage in cooperation with a primary valve seat 4 in the housing 2. The primary valve seat 4 is formed by a seal element 30 arranged in the housing bore hole 5 wherein the seal element is formed e.g. as an injection molded component.

As evident from FIG. 1, the primary stage opens and closes a direct volume connection of the housing bore holes of the input P and the output A. The primary piston 3 includes plural sections 31, 32, 33 with different diameters and is supported by the first section 31 in the housing bore hole 5. The third section 33 that has a smaller diameter than the first section 31 is configured tubular and includes a throttle bore hole 9. A second center section 32 connects the two outer sections 31 and 33 and includes a decreasing outer diameter by which the primary piston 3 is applicable to the primary valve seat 4. When the primary stage is closed the primary piston 3 contacts the primary valve seat 4.

Additionally, the pneumatic valve 1 includes a pilot stage which includes a pilot piston 6 and a pilot valve seat 7. The pilot valve seat 7 is configured as a seal element 34 and arranged at or in the primary piston 3. In order to provide sealing contact the pilot piston 6 includes a cone shaped top section 35 that is configured for sealing application to the circumferential seal element 34 and thus closes the pilot stage. The pilot piston 7 is thus operatively connected with an actuator 8 for opening or closing a throttle bore hole 9 in the primary piston 3. The input P is indirectly connectable with the output A through the primary piston 3 by the throttle bore hole 9.

A back cavity 29 is formed between the primary piston 3 and the housing 2 wherein the back cavity is connectable through the pilot stage with the input P. As evident from FIG. 1, the back cavity 29 is formed in the illustrated embodiment by the housing 2, a housing cover 16 closing the housing bore hole 5 including the shoulders and a primary piston top 17.

The actuator 9 is an electromagnetic actuator and includes an armature 10 that is operatively connected with the pilot piston 6 and coaxially arranged relative to the housing 2. Furthermore, the armature 10 is movable by the magnet coil 18 that envelops the armature 10 so that the armature 10 is movably received in the actuator housing 13 of the actuator 8 wherein the actuator housing envelops the magnet coil 18 at an outer circumference and at least at one face oriented away from the housing 2.

Furthermore, the actuator 8 includes a pole cap 14 arranged in an interior of the actuator housing 13, which includes a pole core 21 and a pole tube 20 arranged in axial sequence towards the face of the magnet coil 18. The pole core 21 and the pole tube 20 are integrally provided in one piece and connected by a connection bar 22. Thus, coaxial misalignments can be precluded. The armature 10 can be supported in a foil structure, arranged in an interior 23 also designated as armature cavity. Alternatively, the armature 10 can be coated. A foil structure or coating magnetically separates the armature 10 and the pole cap 14 which reduces magnetic transversal forces. The pole tube 20 is integrally closed at a side oriented away from the housing 2 or closed by a separate terminal cover. The actuator housing 13 is sealed at the housing 2.

As evident from FIG. 1 the primary piston 3 and the pilot piston 6 can be caused to move into a closing position by spring devices wherein the primary stage and the pilot stage are closed in the closing position and no volume flow connection is provided between input P and output A. Compression springs 11, 12 are provided as spring devices, wherein a first compression spring 11 or primary piston spring is configured to load the primary piston 3 and arranged between the primary piston 3 and the housing 2 and a second compression spring 12 configured to load the pilot piston 6 is arranged between the armature 10 and the pole cap 14.

Alternatively, the second compression spring 12 can be arranged between the pilot piston 6 or between the top section 35 of the pilot piston 6 and the primary piston 3.

The second compression spring 12 or its ends are respectively supported in recesses 24 or 25 of the pole cap 14 or of the armature 10 so that a kinking of the compression spring 12 can be precluded.

The first compression spring 11 can contact a stop 26 attached in the housing 2.

When the actuator 5 is without current, the primary stage and the pilot stage are closed as illustrated in FIG. 1.

When the actuator 8 is provided with a constant current the pilot stage is initially opened so that a volume flow connection between the input P and the back cavity 29 is opened. The medium flows through the input P into the housing 2 and flows through the piston openings 36 of the primary piston 3 through the open pilot stage into the tubular section 32 of the primary piston 3 as indicated by the dashed arrow. From the tubular section 32 the medium flows partially through the throttle bore hole 9 in a direction of the output A and partially in a direction towards the back cavity 29 so that a pressure p is established in the back cavity.

The primary stage opens as soon as the pressure p in the back cavity 29 generates a first force F1 on an effective surface of the piston top 17, as soon as a switching threshold is reached wherein the first force F1 is greater than a sum of a second force F2, a third force F3 and a fourth force F4 acting in the closing direction. Put differently, the primary piston 3 of the primary stage is moved to the left in the drawing and thus opened. Thus, the first force F1 in the back cavity 29 upon the piston top 17 acts in the opening direction.

The second force F2 acting in the closing direction is generated by the outlet pressure at the outlet A on a circular ring surface including the piston top 17 minus a valve seat surface of the primary valve seat 4. The third force F3 acting in the closing direction is generated by the input pressure P that impacts the primary piston 3. The fourth force F4 acting in the closing direction originates from the spring preloading force of the compression spring 11 (primary piston spring).

Figure 2:
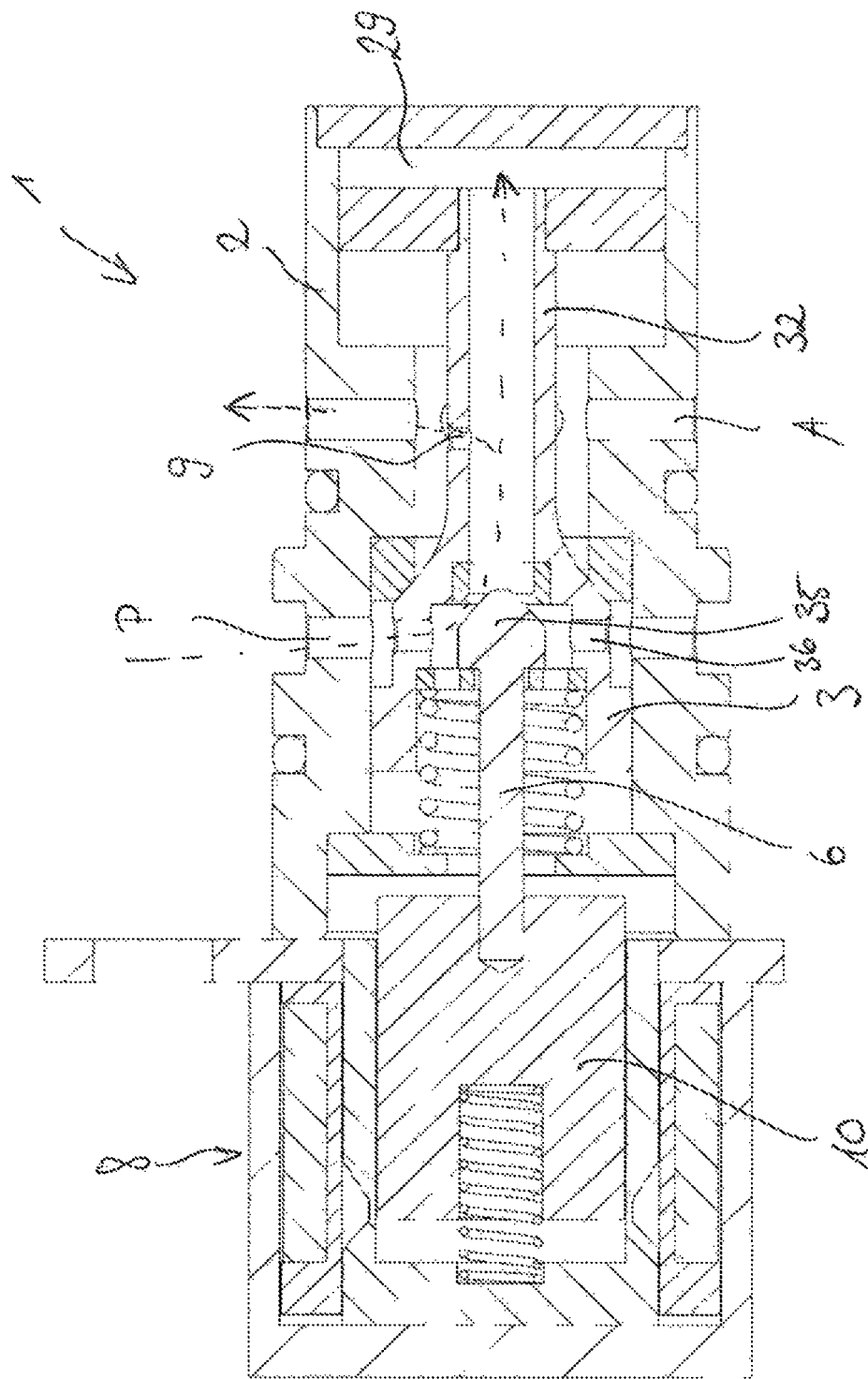
FIG. 2 illustrates a longitudinal sectional view of the pneumatic valve according to FIG. 1 with the pilot stage open.

The primary stage can also open when the force F1 is not greater than the sum of the forces F2, F3, F4. This can be the case when the pilot piston 6 reaches a stop 15 in the primary piston 3 as illustrated in FIG. 2, is thus pulled open by the pilot piston 6 when the actuator force increases further. The stop 15 is thus not primarily configured to limit the stroke of the pilot piston 6 but is rather configured to introduce the actuator force into the primary piston 3. As evident from FIG. 1, the stop 15 attached in the primary piston 3, includes fluid pass through openings to facilitate a fluid exchange within the housing bore hole 5.

Figure 3:
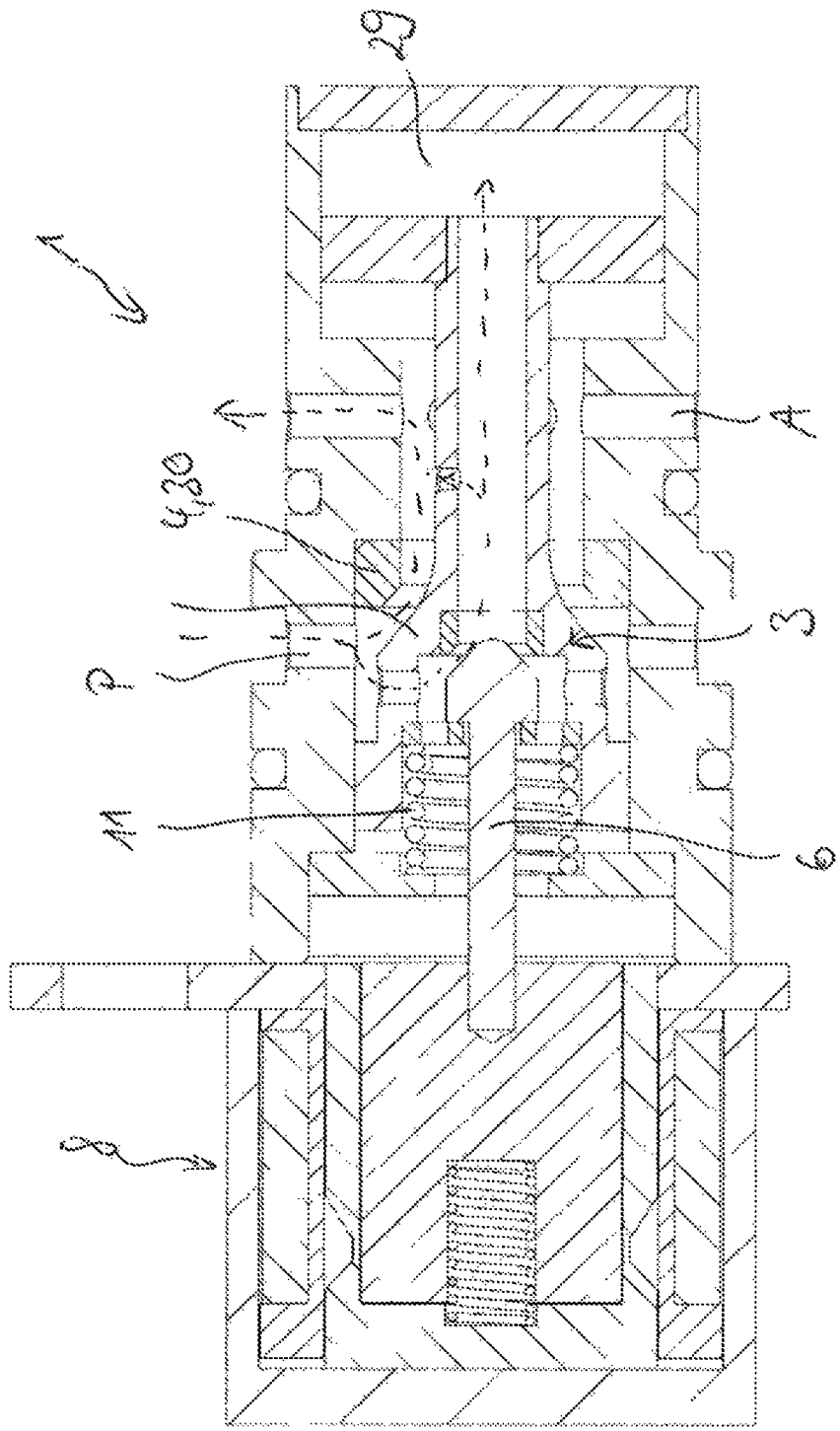
FIG. 3 illustrates a longitudinal sectional view of the pilot valve according to FIG. 1 with the pilot stage and the primary stage open.

The open position is illustrated in FIG. 3. It is evident that the input P is connected directly through the open primary stage and indirectly through the pilot stage and the throttle bore hole 9 with the output A.

What is claimed is:

1. A pneumatic valve for controlling a gaseous medium, the pneumatic valve comprising:
   a housing including an inlet and an outlet;
   a primary piston that forms a primary stage in cooperation with a primary valve seat in the housing, wherein the primary piston is axially movable in a housing bore along a longitudinal axis to open and close a direct volume flow connection between the inlet and the outlet;
   a pilot piston that forms a pilot stage in cooperation with a pilot valve seat at or in the primary piston, wherein the pilot piston is operatively connected with an electromagnetic actuator for opening or closing a throttle bore in the primary piston, wherein the inlet is connectable with the outlet indirectly through the primary piston by the throttle bore; and
   a back cavity that is formed between the primary piston and the housing, wherein the back cavity is connectable through the pilot stage with the inlet,
   wherein the primary stage and the pilot stage are closed when no electric current is provided to the pneumatic valve,
   wherein the pilot piston is movable by an armature of the electromagnetic actuator into an open position, and
   wherein a volume flow connection from the input into the back cavity is established in the open position of the pilot piston.

2. The pneumatic valve according to claim 1, wherein the back cavity is formed by the housing, a housing cover closing the housing bore, and a primary piston top.

3. The pneumatic valve according to claim 1, wherein the primary piston and the pilot piston are respectively movable into a closed position by spring devices.

4. The pneumatic valve according to claim 3,
   wherein compression springs are provided as the spring devices, and
   wherein a first compression spring configured to load the primary piston is arranged between the primary piston and the housing and a second compression spring configured to load the pilot piston is arranged between the primary piston and the pilot piston or between the armature and an actuator housing or a pole cap.

5. The pneumatic valve according to claim 1, wherein the primary piston includes a stop where the pilot piston is applicable so that a stroke of the pilot piston is limited or an actuator force is introduced into the primary piston.

6. The pneumatic valve according to claim 1, wherein the pilot stage is configured as a variable throttle.

7. A method for controlling a gaseous medium or hydrogen in a fuel cell arrangement by a pneumatic valve for controlling a gaseous medium, the pneumatic valve including
   a housing including an inlet and an outlet;
   a primary piston that forms a primary stage in cooperation with a primary valve seat in the housing, wherein the primary piston is axially movable in a housing bore along a longitudinal axis to open and close a direct volume flow connection between the inlet and the outlet;
   a pilot piston that forms a pilot stage in cooperation with a pilot valve seat at or in the primary piston, wherein the pilot piston is operatively connected with an electromagnetic actuator for opening or closing a throttle bore in the primary piston, wherein the inlet is connectable with the outlet indirectly through the primary piston by the throttle bore; and
   a back cavity that is formed between the primary piston and the housing, wherein the back cavity is connectable through the pilot stage with the inlet,
   wherein the primary stage and the pilot stage are closed when no electric current is provided to the pneumatic valve,
   the method comprising:
   closing primary stage and the pilot stage of the pneumatic valve when the electromagnetic actuator is not provided with current; and
   opening the pilot stage when the electromagnetic actuator is provided with a constant electrical current so that a volume flow connection between the input and the back cavity is opened, so that a pressure is provided in the back cavity and the input is simultaneously connected through the throttle bore in the primary piston with the output; and
   opening the primary stage as soon as the pressure in the back cavity reaches a switching threshold and generates a first force in an opening direction wherein the first force in the opening direction is greater than a sum of a second force, a third force and a fourth force acting in the closing direction.

8. A method for controlling the gaseous medium or hydrogen in a fuel cell arrangement by the pneumatic valve according to claim 5, the method comprising:
   closing the primary stage and the pilot stage when the actuator is not provided with electric current;
   opening the pilot stage when the electromagnetic actuator is provided with a constant electrical current so that a volume flow connection between the input and the back cavity is opened so that a pressure is provided in the back cavity and the input is simultaneously connected through the throttle bore hole in the primary piston with the output; and opening the primary stage when the pilot piston contacts the stop in the primary piston and pulling the primary piston open by the pilot piston when the actuator force increases further.

9. The method according to claim 7, wherein the second force acting in the closing direction of the primary piston is generated by an outlet pressure at the outlet impacting a circular annular surface defined by the primary piston top minus a valve seat surface of the primary valve seat, the third force acting in the closing direction of the primary piston is generated by the input pressure acting on the primary piston, and the fourth force acting in the closing direction of the primary piston is generated by a spring preload of a first compression spring.

10. The method according to claim 8, wherein a second force acting in the closing direction of the primary piston is generated by an outlet pressure at the outlet impacting a circular annular surface defined by the primary piston top minus a valve seat surface of the primary valve seat, a third force acting in the closing direction of the primary piston is generated by the input pressure acting on the primary piston, and a fourth force acting in the closing direction of the primary piston is generated by a spring preload of a first compression spring.

11. A fuel cell arrangement including the pneumatic valve according to claim 1, configured to control a hydrogen supply to a fuel cell.

* * * * *